United States Patent [19]

Baker et al.

[11] Patent Number: 4,701,425

[45] Date of Patent: Oct. 20, 1987

[54] INFRARED AND ULTRAVIOLET ABSORBING GLASS COMPOSITIONS

[75] Inventors: Rodney G. Baker, Toledo; Daniel P. Lubelski, Rossford, both of Ohio

[73] Assignee: Libbey-Owens-Ford Co., Toledo, Ohio

[21] Appl. No.: 864,775

[22] Filed: May 19, 1986

[51] Int. Cl.[4] ...................... C03C 3/087; C03C 3/078; C03C 4/08; C03C 4/10
[52] U.S. Cl. ........................................ 501/70; 501/72; 501/904; 501/905
[58] Field of Search .................... 501/904, 905, 70, 72

[56] References Cited

U.S. PATENT DOCUMENTS 2,755,212  7/1956  Brown .................................. 501/905
3,581,137  5/1971  Arnott et al. ........................ 501/905
3,779,733  12/1973  Janakirame-Rao .................. 501/70

*Primary Examiner*—Mark L. Bell
*Attorney, Agent, or Firm*—Marshall & Melhorn

[57] ABSTRACT

A soda-lime-silica glass composition containing $TiO_2$ for forming glass articles, e.g., glazings, the composition absorbing both infrared and ultraviolet radiation and having an Illuminant A (red and blue end of the spectrum) transmittance of about 68 percent or more, an Illuminant C transmittance of at least about 70 percent, and a solar ultraviolet transmittance of about 50 percent.

9 Claims, No Drawings

INFRARED AND ULTRAVIOLET ABSORBING GLASS COMPOSITIONS

The present invention is directed to infrared and ultraviolet radiation absorbing soda-lime-silica glass compositions containing $TiO_2$, and to methods of making the compositions and forming glass articles, therefrom.

BACKGROUND OF THE INVENTION

In the manufacture of infrared radiation absorbing soda-lime-silica glass compositions for use in making glass glazings for automotive and architectural applications, iron has been used. The iron is in the form of ferrous ions and ferric ions in the glass made under ordinary melting conditions.

In Janakirama - Rao U.S. Pat. No. 3,779,733, glass articles are formed from soda-lime-silica glass compositions in which at least 80 percent of the total iron in the glass is in the ferrous state. The patent states that the glass articles have a light transmittance of greater than 70 percent at 0.25 inch thickness between wavelengths of 350 to 500 millimicrons (blue light). Both iron and tin are incorporated in the soda-lime-silica glasses, the glass composition of Example 1 being as follows:

| Component | Percent by Weight |
| --- | --- |
| $SiO_2$ | 71.0 |
| $Na_2O$ | 13.5 |
| CaO | 8.5 |
| MgO | 3.8 |
| $Al_2O_3$ | 0.2 |
| $SnO_2$ | 2.5 |
| $Fe_2O_3$ | 0.5 |
| $SO_3^{-2}$ | 0.2 |
| $Cl^{-1}$ | 0.1 |

The iron content was reported as follows:

| Component | Percent by Weight |
| --- | --- |
| $Fe_2O_3$ | 0.01 |
| FeO | 0.21 |

The U.S. Pat. No. 3,779,733 further states that at least part of the tin used be in the form of metallic tin to provide stannous ions upon the melting of the glass batch, the molar ratio of stannous ions to ferrous ions in the glass article being at least about 1:1. The stannous ions are said to act as an internal reducing agent to prevent oxidation of the ferrous ion to the ferric species if the glass is reheated during fabrication.

The above described glass having ferrous ions does have infrared radiation absorbing properties, having a strong absorption band centered at 1060 nanometers. However, in order to obtain sufficient infrared absorption, high iron levels must be used which in turn undesirably decreases Illuminant A values below about 70 percent, which, for example, is too low to meet the Federal Illuminant A requirements of at least about 70 percent for automotive windshield glass. As is known, the Illuminant A value includes transmittance on the red end as well as the blue end of the spectrum.

The above described U.S. Pat. No. 3,779,733 glass can generally pass the Illuminant C test, which concerns transmittance in the blue end of the spectrum. The glass does not absorb ultraviolet radiation which is needed for some applications.

There is a need in the art to provide both infrared radiation and ultraviolet radiation absorbing glass compositions for motor vehicle glass, e.g., windshields, and architectural glass.

OBJECTS OF THE INVENTION

It is an object of the present invention to provide an infrared radiation and an ultraviolet radiation absorbing glass composition for forming glass articles therefrom, the articles also having a Federal Illuminant A transmittance value of at least about 68 percent, good Illuminant C transmittance (blue end) of at least about 70 percent, relatively low total solar transmittance values of about 50 percent or less, (and hence, high infrared absorbing capabilities) and a solar ultraviolet transmittance value at 0.250 inch glass thickness of about 50 percent or less.

It is another object of the present invention to provide an infrared and ultraviolet radiation absorbing soda-lime-silica glass composition containing $TiO_2$, and glass articles made from the composition, the resultant glass having an Illuminant A transmittance value of at least 68 percent or more, an Illuminant C transmittance value of at least about 70 percent, and a solar ultraviolet transmittance value of about 50 percent or less.

These and other objects will be apparent from the following description and the appended claims.

SUMMARY OF THE INVENTION

The present invention provides an infrared and ultraviolet radiation absorbing glass composition that has a high Illuminant C transmittance value (blue end of the spectrum), a relatively low total solar transmittance of no more than about 50 percent, a high Illuminant A transmittance value (blue end and red end of the spectrum) of at least about 68 percent at a 0.25 inch glass thickness and minimized solar ultraviolet transmittance of about 50 percent or less. The glass composition comprises the following ingredients in approximate percent by weight:

| Ingredients | Percent by Weight |
| --- | --- |
| $SiO_2$ | 60–80 |
| $Na_2O$ | 10–20 |
| $K_2O$ | 0–10 |
| CaO | 5–16 |
| MgO | 0–10 |
| $Al_2O_3$ | 0–5 |
| $SO_3$ | 0–0.5 |
| $Fe_2O_3$ | 0.29–0.6 |
| $SnO_2$ | 0.1–1.5 |
| $TiO_2$ | 0.1–1.6 | the composition absorbing both infrared and ultraviolet radiation.

The present invention also provides a method of making an infrared absorbing glass article adapted for use in motor vehicle glazings and architectural glass, the method comprising the steps of:

A. providing a glass batch composition,
B. melting the batch to provide a glass composition comprising the following ingredients in approximate percent by weight:

| Ingredients | Percent by Weight |
| --- | --- |
| $SiO_2$ | 60–80 |

| Ingredients | Percent by Weight |
|---|---|
| Na$_2$O | 10-20 |
| K$_2$O | 0-10 |
| CaO | 5-16 |
| MgO | 0-10 |
| Al$_2$O$_3$ | 0-5 |
| SO$_3$ | 0-0.5 |
| Fe$_2$O$_3$ | 0.29-0.6 |
| SnO$_2$ | 0.1-1.5 |
| TiO$_2$ | 0.1-1.6 | the composition absorbing both infrared and ultraviolet radiation, and;

C. forming the melted composition into a flat glass sheet.

Although not completely understood, there are two preferred ranges of TiO$_2$ within the broad range of about 0.1 to 1.6 weight percent. A preferred range of TiO$_2$ is about 0.40 to 0.50 and the optimum within that range is about 0.45 weight percent. Another preferred range is about 0.90 to 1.1 weight percent TiO$_2$, the optimum in that range being about 1.0 weight percent TiO$_2$.

In the above decribed glass composition, about 0.470 to 0.510 weight percent Fe$_2$O$_3$, and about 0.42 to 0.52 weight percent SnO$_2$, are preferred when the range of TiO$_2$ is about 0.40 to 0.50 weight percent. A preferred batch composition for this glass is as follows (in parts by weight):

| Sand | 900-1100 |
|---|---|
| Limestone | 40-130 |
| Soda Ash | 250-410 |
| Dolomite | 150-400 |
| Gypsum | 6-12 |
| Fe$_2$O$_3$ | 4-8 |
| TiO$_2$ | 2-10 |
| SnO$_2$ | 2-12 |
| Seacoal | .2-.7 |

When the range of TiO$_2$ is about 0.90 to 1.1 weight percent, the preferred ranges of Fe$_2$O$_3$ and SnO$_2$ are about 0.345 to 0.365 and about 0.85 to 1.05, respectively. A preferred batch composition for this glass is as follows (in parts by weight):

| Sand | 900-1100 |
|---|---|
| Aragonite | 45-135 |
| Soda Ash | 235-395 |
| Dolomite | 160-410 |
| Salt Cake | 4-12 |
| Rouge (94%-96% Fe$_2$O$_3$) | 4-8 |
| TiO$_2$ | 5-20 |
| SnO$_2$ | 5-20 |
| Seacoal | .4-1 |

DESCRIPTION OF THE PREFERRED EMBODIMENTS

The following examples illustrate the glass composition that is readily formed into a glass article or glazing such as an automotive windshield or architectural glass window, the composition absorbing both infrared and ultraviolet rays and having an Illuminant A value of at least about 68 percent and a solar ultraviolet transmittance of about 50 percent or less.

Raw batch glass compositions were mixed and heated at about 2700° F. to produce molten glasses which were then formed into sheets or plates, the raw batches being as follows:

| | Raw Batch Glass Compositions - (weight in grams) | | | | |
|---|---|---|---|---|---|
| | I | II | III | IV | V |
| Sand | 1000 | 1000 | 1000 | 1000 | 1000 |
| Limestone | 71.80 | 71.80 | 71.80 | 71.80 | 71.80 |
| Soda Ash | 328.73 | 328.73 | 328.73 | 328.73 | 328.73 |
| Dolomite | 244.87 | 244.87 | 244.87 | 244.87 | 244.87 |
| Gypsum | 7.93 | 7.93 | 7.93 | 7.93 | 7.93 |
| Fe$_2$O$_3$ | 6.67 | 6.33 | 6.33 | 6.33 | 5.67 |
| TiO$_2$ | 2.00 | 2.00 | 6.00 | 6.00 | 6.00 |
| SnO$_2$ | 10.00 | 11.67 | 10.00 | 6.67 | 10.00 |
| Seacoal | 0.40 | 0.40 | 0.40 | 0.50 | 0.50 |

The spectral results at 0.250 thickness of the glaases are as follows:

| Spectral Results | | | | | |
|---|---|---|---|---|---|
| Ill. A. Transmittance | 71.5 | 70.9 | 68.8 | 69.9 | 71.2 |
| Ill. C. Transmittance | 73.3 | 72.8 | 70.6 | 71.8 | 72.9 |
| Total Solar Transmittance | 45.5 | 44.1 | 41.8 | 42.0 | 45.1 |
| Solar UV Transmittance | 34.6 | 37.5 | 31.0 | 34.0 | 33.4 |

In the glass samples, Glasses I through V had the following approximate composition:

| | Percent by Weight | | | | |
|---|---|---|---|---|---|
| Components | I | II | III | IV | V |
| SiO$_2$ | 72.1 | 72.1 | 71.9 | 72.1 | 72.0 |
| Na$_2$O | 13.4 | 13.4 | 13.4 | 13.4 | 13.4 |
| K$_2$O | 0.20 | 0.20 | 0.20 | 0.20 | 0.20 |
| CaO | 8.4 | 8.4 | 8.3 | 8.4 | 8.3 |
| MgO | 3.9 | 3.9 | 3.9 | 3.9 | 3.9 |
| Al$_2$O$_3$ | .21 | .21 | .21 | .21 | .21 |
| Fe$_2$O$_3$ | .510 | .485 | .479 | .480 | .431 |
| SnO$_2$ | .714 | .832 | .712 | .476 | .712 |
| TiO$_2$ | .157 | .157 | .445 | .446 | .445 |
| SO$_3$ | .20 | .20 | .20 | .20 | .20 |

A preferred glass composition containing TiO$_2$ (in one of the preferred ranges of 0.4 to 0.5) is as follows:

| Ingredients | Percent by weight |
|---|---|
| SiO$_2$ | 70-74 |
| Na$_2$O | 12-16 |
| K$_2$O | 0-1 |
| CaO | 5-11 |
| MgO | 2-6 |
| Al$_2$O$_3$ | 0-1 |
| SO$_3$ | 0-1 |
| Fe$_2$O$_3$ | 0.450-0.550 |
| SnO$_2$ | 0.42-0.52 |
| TiO$_2$ | 0.40-0.50 | the glass absorbing both infrared and ultraviolet rays.

Another series of glass compositions were prepared to illustrate the preferred range of about 0.9 to 1.1 weight percent of TiO$_2$.

Raw batch glass compositions were mixed and heated at about 2700° F. to produce molten glasses which were then formed into sheets or plates, the raw batches being as follows:

| Raw Batch Glass Compositions - (weight in grams) | | | | | |
| --- | --- | --- | --- | --- | --- |
|  | VI | VII | VIII | IX | X |
| Sand | 1000 | 1000 | 1000 | 1000 | 1000 |
| Aragonite | 76.67 | 76.67 | 76.67 | 76.67 | 76.67 |
| Soda Ash | 313.33 | 313.33 | 313.33 | 313.33 | 313.33 |
| Dolomite | 252 | 252 | 252 | 252 | 252 |
| Salt Cake | 6 | 6 | 6 | 6 | 6 |
| Rouge (95% $Fe_2O_3$) | 4.67 | 4.67 | 4.67 | 3.67 | 4.67 |
| $TiO_2$ | 13.60 | 9.33 | 13.60 | 13.60 | 13.60 |
| $SnO_2$ | 13.00 | 13.00 | 9.33 | 13.00 | 13.00 |
| Seacoal | 0.67 | 0.67 | 0.67 | 0.67 | — |

The spectral results at 0.250 thickness of the glasses are as follows:

| Spectral Results | | | | | |
| --- | --- | --- | --- | --- | --- |
| Ill. A. Transmittance | 70.6 | 68.3 | 70.1 | 72.0 | 74.4 |
| Ill. C. Transmittance | 72.3 | 70.6 | 71.8 | 73.8 | 75.4 |
| Total Solar Transmittance | 40.9 | 38.0 | 41.0 | 42.9 | 49.7 |
| Solar UV Transmittance | 33.8 | 40.0 | 35.8 | 41.1 | 32.1 |

In the glass samples, Glasses VI through X had the following approximate composition:

|  | Percent by Weight | | | | |
| --- | --- | --- | --- | --- | --- |
| Components | VI | VII | VIII | IX | X |
| $SiO_2$ | 71.8 | 71.8 | 71.8 | 71.8 | 71.8 |
| $Na_2O$ | 13.3 | 13.3 | 13.3 | 13.3 | 13.3 |
| $K_2O$ | 0.01 | 0.01 | 0.01 | 0.01 | 0.01 |
| CaO | 8.4 | 8.4 | 8.4 | 8.4 | 8.4 |
| MgO | 3.9 | 3.9 | 3.9 | 3.9 | 3.9 |
| $Al_2O_3$ | .10 | .10 | .10 | .10 | .10 |
| $Fe_2O_3$ | .355 | .354 | .360 | .296 | .355 |
| $SnO_2$ | .92 | .92 | .61 | .92 | .92 |
| $TiO_2$ | .99 | .72 | .99 | .99 | .99 |
| $SO_3$ | .18 | .18 | .18 | .18 | .18 |

A preferred glass composition containing $TiO_2$ in the preferred range of 0.9 to 1.1 is as follows:

| Ingredients | Percent by Weight |
| --- | --- |
| $SiO_2$ | 68-74 |
| $Na_2O$ | 11-14 |
| $K_2O$ | 0-1 |
| CaO | 6-13 |
| MgO | 1.5-4 |
| $Al_2O_3$ | 0-3.5 |
| $SO_3$ | 0-0.5 |
| $Fe_2O_3$ | 0.345-0.365 |
| $SnO_2$ | 0.85-1.05 |
| $TiO_2$ | 0.90-1.10 | the glass absorbing both infrared and ultraviolet rays.

What is claimed is:

1. A glass composition consisting essentially of the following ingredients in approximate percent by weight:

| Ingredients | Percent by Weight |
| --- | --- |
| $SiO_2$ | 60-80 |
| $Na_2O$ | 10-20 |
| $K_2O$ | 0-10 |
| CaO | 5-16 |
| MgO | 0-10 |
| $Al_2O_3$ | 0-5 |
| $SO_3$ | 0-0.5 |
| $Fe_2O_3$ | 0.29-0.6 |
| $SnO_2$ | 0.1-1.5 |
| $TiO_2$ | 0.1-1.6 | the composition absorbing both infrared and ultraviolet rays.

2. A glass compositon as defined in claim 1 in which $Fe_2O_3$ is about 0.470 to 0.510 weight percent, $SnO_2$ is about 0.42 to 0.52 weight percent, $TiO_2$ is about 0.40 to 0.50 weight percent.

3. A glass composition as defined in claim 1 in which the $TiO_2$ is about 0.45 weight percent.

4. A glass composition consisting essentially of the following ingredients in approximate percent by weight:

| Ingredients | Percent by weight |
| --- | --- |
| $SiO_2$ | 70-74 |
| $Na_2O$ | 12-16 |
| $K_2O$ | 0-1 |
| CaO | 5-11 |
| MgO | 2-6 |
| $Al_2O_3$ | 0-1 |
| $SO_3$ | 0-1 |
| $Fe_2O_3$ | 0.450-0.550 |
| $SnO_2$ | 0.42-0.52 |
| $TiO_2$ | 0.40-0.50 | the glass absorbing both infrared and ultraviolet radiation.

5. A composition as defined in claim 4 in which the amount of $TiO_2$ is about 0.45 weight percent.

6. A glass composition as defined in claim 1 in which $Fe_2O_3$ is about 0.345 to 0.365 weight percent, $SnO_2$ is about 0.85 to 1.05 weight percent, and $TiO_2$ is about 0.90 to 1.10 weight percent.

7. A glass composition as defined in claim 1 in which the $TiO_2$ is about 1.00 weight percent.

8. A glass composition consisting essentially of the following ingredients in approximate percent by weight:

| Ingredients | Percent by Weight |
| --- | --- |
| $SiO_2$ | 68-74 |
| $Na_2O$ | 11-14 |
| $K_2O$ | 0-1 |
| CaO | 6-13 |
| MgO | 1.5-4 |
| $Al_2O_3$ | 0-3.5 |
| $SO_3$ | 0-0.5 |
| $Fe_2O_3$ | 0.345-0.365 |
| $SnO_2$ | 0.85-1.05 |
| $TiO_2$ | 0.90-1.10 | the glass absorbing both infrared and ultraviolet radiation.

9. A composition as defined in claim 8 in which the amount of $TiO_2$ is about 1.00 weight percent.

* * * * *